H. A. HOKE.
ELLIPTICAL SPRING.
APPLICATION FILED FEB. 9, 1914.
1,101,931.
Patented June 30, 1914.
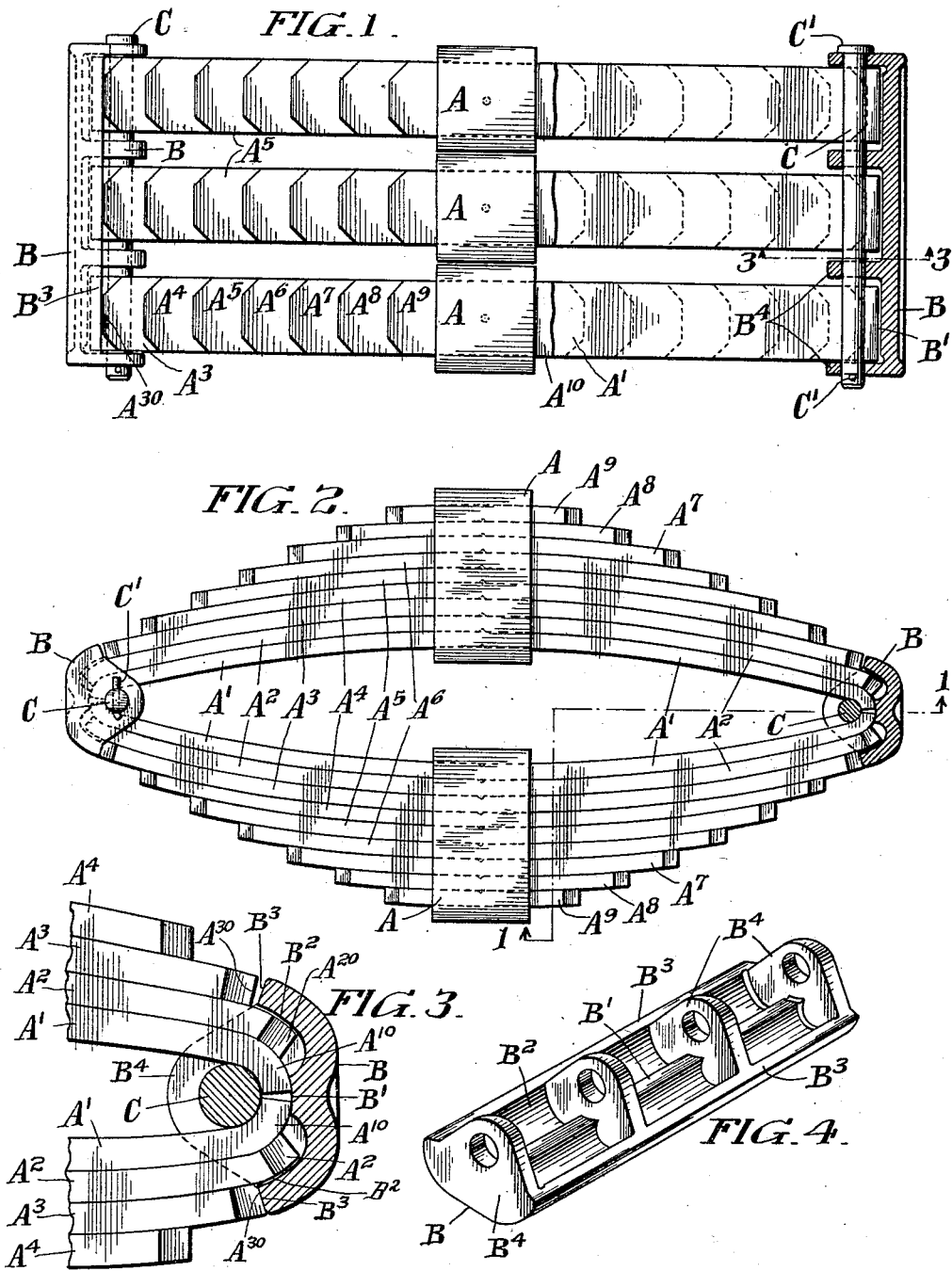

ized under the laws of the United States.

UNITED STATES PATENT OFFICE.

HARRY A. HOKE, OF ALTOONA, PENNSYLVANIA.

ELLIPTICAL SPRING.

1,101,931.  Specification of Letters Patent.  Patented June 30, 1914.

Application filed February 9, 1914. Serial No. 817,407.

*To all whom it may concern:*

Be it known that I, HARRY A. HOKE, a citizen of the United States of America, residing in Altoona, in the county of Blair and State of Pennsylvania, have invented certain new and useful Improvements in Elliptical Springs, of which the following is a true and exact description, reference being had to the accompanying drawings, which form a part thereof.

My present invention relates to elliptical leaf springs; and the object of my invention is to provide simple and effective means for securing the ends of the two halves of such a spring together in such manner as to obtain ample strength at the spring ends and to guard against accidental separation or displacement of the connecting ends of the spring halves.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated and described a preferred form in which my invention may be embodied.

Of the drawings, Figure 1 is an inverted plan, partly broken away and in section on the line 1—1 of Fig. 2; Fig. 2 is an elevation, partly in section, of the spring shown in Fig. 1; Fig. 3 is a partial sectional elevation of a portion of the spring structure shown in Figs. 1 and 2, the section being taken on the line 3—3 of Fig. 2; and Fig. 4 is a perspective view of an end connecting piece employed.

The spring structure shown in the drawings comprises three elliptical spring units proper. Each spring unit consists of two spring halves and each of the latter is composed of a plurality of leaves, $A'$, $A^2$, $A^3$, $A^4$, $A^5$, $A^6$, $A^7$, $A^8$ and $A^9$. The bundle of leaves forming each spring half are secured together by the sleeve or link A, surrounding the assembled leaves at the middle of the spring half. The ends $A^{10}$ of each inner leaf $A'$ are inturned, and as shown are curved to fit snugly against a portion of the round bar or bolt C which holds the opposing inner leaves $A'$ of the assembled spring unit apart, and passes through the apertured ears $B^4$ of a corresponding recessed end member B. Each bolt C is shown as removably secured in place by a bent pin $C'$. The member B, as shown, is formed with a seat $B'$, against which the outer sides of the inturned end portions $A^{10}$ bear, and is formed with opposed surfaces $B^2$ between which portions of the two spring halves project and by which the spring halves are prevented from accidental separation. As shown, the surfaces $B^2$ are curved to fit over the ends $A^{20}$ of the spring leaves $A^2$. The ends $A^{20}$ are curved to fit against the curved inturned ends $A^{10}$ of the spring leaves $A^1$. As shown, the surfaces $B'$ and $B^2$ are all substantially cylindrical about the axis of the bolt C as an axis, and to positively hold the member B against undesirable angular displacement about this axis, the parts are so proportioned and arranged that the edges $B^3$ of the member B will engage the ends $A^{30}$ of the corresponding spring leaves $A^3$ on a slight angular displacement of the member B in either direction from a neutral position. Normally, as shown best in Fig. 3, the lower edge $B^3$ of each member B will be in engagement with the corresponding leaf end $A^{30}$.

The spring structure shown is of the type employed in locomotive tenders, and while the invention is applicable to elliptical springs for general use, it is of especial advantage for use where the operating conditions are as severe, and reliability is as important as they are in railway rolling stock. While the invention, as shown, is employed in a spring structure in which there are three elliptical spring units, it will be understood, of course, that the invention is applicable to a structure comprising one, two, or more than three units, the members B and bolts C being shortened or elongated and the number of apertured ears $B^4$ being increased or diminished accordingly.

The construction described is inherently simple and durable, and the spring halves are readily connected and disconnected, whenever this is necessary. The end connection obviously prevents the end of each spring half from moving relatively to the end of the other in a direction parallel to the length of the bolt C, and also prevents the connected ends from separating under the forces sometimes occurring which tend to lift the upper spring half or cause it to jump away from the lower spring half.

The construction obviously permits the ends of the spring to be made as strong as need be, since the load at the end of the spring need not be transmitted through a single leaf, but may be transmitted through as many leaves as are necessary, and none of the leaves are weakened by the provisions made for the end connections. As shown, three spring leaves A', A² and A³ are effective in transmitting the load at the extreme end of each spring half.

While in accordance with the provisions of the statutes I have illustrated and described the best form of my invention now known to me, it will be apparent to those skilled in the art that changes may be made in the form of apparatus disclosed, without departing from the spirit of my invention, and that under some conditions certain features of my invention may be used without a corresponding use of other features.

Having now described my invention, what I claim as new and desire to secure by Letters Patent, is:

1. In an elliptical spring, the combination with the two halves each composed of a plurality of leaves and each having the ends of its inner leaf inturned, of means for connecting one end of each spring half to the corresponding end of the other spring half comprising a member having opposed surfaces between which portions of each spring half project and a bar bearing against the inner sides of said inturned portions and connected to the said member at the sides of the spring.

2. In an elliptical spring, the combination with the two spring halves each composed of a plurality of leaves and each having the ends of its inner leaf inturned, of means for connecting one end of each spring half to the corresponding end of the other spring half comprising a member recessed to receive end portions of each spring half and having opposed surfaces between which portions of each spring half project whereby the spring halves are prevented from separating when said member is in place, and a bar spacing the opposite inner leaves of the two spring halves apart and bearing against the inner sides of said inturned portions and connected to the said member at the sides of the spring.

3. In an elliptical spring, the combination with the two halves each composed of a plurality of leaves and each having the ends of its inner leaf inturned and having an outer leaf slightly shorter than said inner leaf, of means for connecting one end of each spring half to the corresponding end of the other spring half comprising a bar passing between the said inner leaves and engaging the inner sides of the inturned end portions thereof, and a member secured to said bar and formed with opposed portions between which extend such of the leaves of said spring as lie between the said shorter outer leaves of the two spring halves, the edges of said portions being juxtaposed to the end edges of said shorter outer leaves.

4. In an elliptical spring, the combination of the two halves each composed of a plurality of leaves of which the inner leaf has its ends inturned and an outer leaf is slightly shorter than said inner leaf, of means for connecting one end of each spring half to the corresponding end of the other spring half comprising a bar passing between the said inner leaves and engaging the inner sides of the inturned end portions thereof and a recessed member formed with the apertured ears B⁴ receiving the said bar and with the surfaces B², against which bear the outer sides of the leaves of the two spring halves which lie between said shorter outer leaves, and formed with the shoulders B³ adapted to engage the ends of said shorter outer leaves.

HARRY A. HOKE.

Witnesses:
B. C. McCormick,
James T. Hanlon.